(12) United States Patent
Shen

(10) Patent No.: US 8,970,485 B2
(45) Date of Patent: Mar. 3, 2015

(54) ELECTRONIC DEVICE

(71) Applicant: Lenovo (Beijing) Co., Ltd., Beijing (CN)

(72) Inventor: Maojiang Shen, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 82 days.

(21) Appl. No.: 13/956,436

(22) Filed: Aug. 1, 2013

(65) Prior Publication Data

US 2014/0035810 A1 Feb. 6, 2014

(30) Foreign Application Priority Data

Aug. 1, 2012 (CN) .......................... 2012 1 0271851

(51) Int. Cl.
*G06F 3/147* (2006.01)
*G06F 3/14* (2006.01)
*G06F 1/16* (2006.01)

(52) U.S. Cl.
CPC .............. *G06F 3/147* (2013.01); *G06F 3/1423* (2013.01); *G09G 2356/00* (2013.01); *G06F 1/1616* (2013.01); *G06F 1/1666* (2013.01); *G06F 1/1677* (2013.01)
USPC .......................................................... 345/156

(58) Field of Classification Search
CPC ............. G09G 3/18; G09G 3/20; G09G 3/32; G09G 5/00; G06F 3/147; G06F 3/041; G06T 1/00
See application file for complete search history.

(56) References Cited

U.S. PATENT DOCUMENTS

| | | | | |
|---|---|---|---|---|
| 6,466,202 | B1 * | 10/2002 | Suso et al. ..................... | 345/169 |
| 7,230,585 | B2 * | 6/2007 | Wakefield ........................ | 345/55 |
| 7,869,204 | B2 * | 1/2011 | Bair et al. ................. | 361/679.3 |
| 2004/0080468 | A1 * | 4/2004 | Wakefield ........................ | 345/55 |
| 2011/0216064 | A1 * | 9/2011 | Dahl et al. .................... | 345/428 |
| 2012/0194456 | A1 * | 8/2012 | Fujii et al. ..................... | 345/173 |

* cited by examiner

*Primary Examiner* — Andrew Sasinowski
(74) *Attorney, Agent, or Firm* — Brinks Gilson & Lione; G. Peter Nichols

(57) ABSTRACT

An electronic device includes a first body with a first face and a second face opposite to the first face; a second body with a third face and a fourth face opposite the third face; a first connecting unit connected to the first and second body and set at a first edge of the first face. The first body can be rotated relative to the second body through the first connecting unit. The electronic device is in a first state when an angle between the first and second body is in a first interval and in a second state when the angle is in a second interval. A first displaying unit is set on the first face; a display direction of which is a first direction from the first edge to a second edge opposite to the first edge when the electronic device is in the second state.

11 Claims, 2 Drawing Sheets

ELECTRONIC DEVICE

This application claims priority to Chinese Patent Application No. 201210271851.0 filed on Aug. 1, 2012 the entire contents of which is incorporated herein by reference.

The present disclosure relates to a field of computer technology, in particular to an electronic device.

BACKGROUND

With the development of the computer technology, an increasing number of electronic devices have entered into the life of people, ranging from a desktop computer to a notebook computer, further to panel electronic devices popular in recent years, such as a panel computer, a mobile phone, an MP3 and the like. These devices are becoming smaller and are provided with basic functions required for entertainment and work, thus being well accepted by the majority of users.

At present, most of panel electronic devices on the market have the same tendency on functions and forms. The panel computer emphasizes more on entertainment, and is used especially for viewing webpages and videos, reading books and playing games. When a user uses his/her panel computer, he/she mostly takes the panel computer in hands, or lays it flat on a desk, or holds it with an external support; when the user inputs text, he/she mostly uses a virtual keyboard or connects the computer to an external keyboard.

However, in the process of implementing technical solutions of embodiments of the present disclosure, the inventors of the present application found out that at least the following technical problems exist in the technology described above:

1. Since the user mostly takes a panel computer in hands, or lays it flat on the desk, or holds it with an external support when he/she uses the panel computer, the panel electronic device cannot carry out the adjustment of the angle of the display screen based on its structure while being used, which thus causes a technical problem that the panel electronic device fails to be quickly switched between a panel computer state and a notebook computer state.

2. Since the panel electronic device per se does not have a supporting structure, the panel electronic device can only be placed on a plane while being used, and the angle of the plane on which the panel electronic device is placed cannot be adjusted, which thus causes a technical problem that the angle of the panel computer cannot be flexibly adjusted in the process of using the computer.

SUMMARY

The present disclosure provides an electronic device for solving the technical problem existing in the prior art that the panel electronic device cannot be quickly switched between the panel computer state and the notebook computer state.

The present disclosure provides an electronic device according to one embodiment of the present application. The electronic device comprises a first state and a second state. The electronic device comprises a first body, comprising a first face and a second face, wherein the first face and the second face are two opposite faces on the first body; a second body, comprising a third face and a fourth face, wherein the third face and the fourth face are two opposite faces on the second body, and the third face is opposite to the second face; a first connecting unit being connected with the first body and the second body respectively, wherein the first body can be rotated relative to the second body through the first connecting unit; the electronic device is in the first state, when an included angle between the first body and the second body is in a first interval ranging from a first value to a second value; the electronic device is in the second state, when the included angle between the first body and the second body is in a second interval ranging from the second value to a third value, wherein the first value is smaller than the second value, and the second value is smaller than the third value; and a first displaying unit being set on the first face, wherein a display direction of the first displaying unit is a first direction when the electronic device is in the second state, the first direction being a direction from a first edge of the first face to a second edge opposite to the first edge; wherein the first connecting unit is set at the first edge.

Preferably, the electronic device further comprises: a first detecting unit for detecting whether the display direction is the first direction in a process of the electronic device being switched from the first state to the second state; and a display adjusting unit for changing the display direction to the first direction when the display direction is not the first direction.

Preferably, the electronic device further comprises an input unit for acquiring an input operation of the user; and a first fixing unit for connecting the input unit with the second body.

Preferably, the electronic device further comprises: a second connecting unit being connected with the second body, wherein the input unit can be moved relative to the second body through being connected with the second connecting unit, such that the input unit is switched between an operation state and a non-operation state.

Preferably, the electronic device further comprises: a wireless transmitting unit for carrying out data transmission between the input unit and the second body after the input unit is disconnected from the second body.

Preferably, the input unit is in a first operating mode when the input unit is connected with the second body; and the input unit is in a second operating mode when the input unit is disconnected from the second body.

Preferably, the input unit comprises an acceleration sensing unit for sensing an acceleration received by the input unit when the input unit is in the second operating mode.

Preferably, the first body further comprises a second displaying unit being set on the second face.

Preferably, the electronic device further comprises: a second detecting unit for detecting whether there is a predetermined triggering operation; and a switching unit for controlling the second displaying unit to be in the non-operation state when the predetermined triggering operation is detected.

Preferably, the electronic device further comprises: a first image acquisition unit being set at a position of the first face close to the first edge.

Preferably, the electronic device further comprises: a second image acquisition unit being set at a position of the first face close to the second edge.

One or more technical solutions provided in the embodiments of the present application have at least the following technical effects or advantages:

1. A first connecting unit is set on the first edge of the first face of the first body, such that the first body is connected with the second body through the first connecting unit, and can be rotated relative to the second body. Further, the first edge is a starting point of the display direction of the first displaying unit. Then, it can be known therefrom that the first connecting unit is set at a position close to the body of the user, such that the use is able to conveniently rotate the first body while using the electronic device, which thus effectively solves the technical problem that the panel electronic device fails to be quickly switched between the panel computer state and the notebook computer state, so as to meet the user's double needs for entertainment experience and highly-efficient commercial work.

2. The first connecting unit is set between the first body and the second body, such that the first body can be moved relative to the second body, which thus effectively solves the technical problem that the angle of the panel electronic device cannot be flexibly adjusted in the process of using the panel electronic device, so as to achieve a flexible adjustment of the angle of the display screen of the panel electronic device.

3. A detachable input unit is set on the second body, such that the user is able to use an entity input device to carry out text input in the process of using the panel electronic device, and the input device can carry out data communication with the panel electronic device through the wireless transmission unit, which thus effectively solves the technical problem that a remote communication cannot be carried out between an entity keyboard and the panel electronic device, so that the user can perform input operation on the panel electronic device by using the input unit at a remote distance.

4. The panel electronic device further comprises the second displaying unit, such that in the process of using the panel electronic device, the panel electronic device can be provided for two users to use simultaneously and further can be quickly switched between the panel computer state and the notebook computer state.

DETAILED DESCRIPTION

The present disclosure provides an electronic device for solving the technical problem that the electronic device fails to be quickly switched between the panel computer state and the notebook computer state. A first connecting unit is set on the first edge of the first face of the first body, such that the first body is connected with the second body through the first connecting unit, and can be rotated relative to the second body. Further, the first edge is the starting point of the display direction of the first displaying unit. Then, it can be known therefrom that the first connecting unit is set at the position close to the body of the user, such that the user is able to conveniently rotate the first body while using the electronic device, which thus effectively solves the technical problem that the electronic device fails to be quickly switched between the panel computer state and the notebook computer state, so as to meet the user's double needs for favorable entertainment experience and highly-efficient commercial work.

In order to solve the technical problem that the electronic device fails to be quickly switched between the panel computer state and the notebook computer state, the technical solutions of embodiments of the present disclosure have the following general concepts:

The first connecting unit is set at positions of the first body and the second body close to the body of the user, such that the first body can be rotated relative to the second body, so as to flexibly adjust the angle of the display screen; further, the first connecting unit is set on the first edge of the first face of the first body, and then the user is able to conveniently rotate the first body while using the electronic device. As such, the electronic device can be carried out with a quick switch between the panel computer state and the notebook computer state.

In order to better understand the technical solutions described above, below will be a detailed specification of the technical solutions in combination with the drawings of the specification and the specific embodiments.

An embodiment of the present application provides an electronic device. The electronic device may be a panel computer, or may be a smart phone and the like. The electronic device comprises a first state and a second state. The first state herein may be a panel computer state and the second state herein may be a notebook computer state. The present embodiment takes the panel computer as an example to specify.

Figure 1:
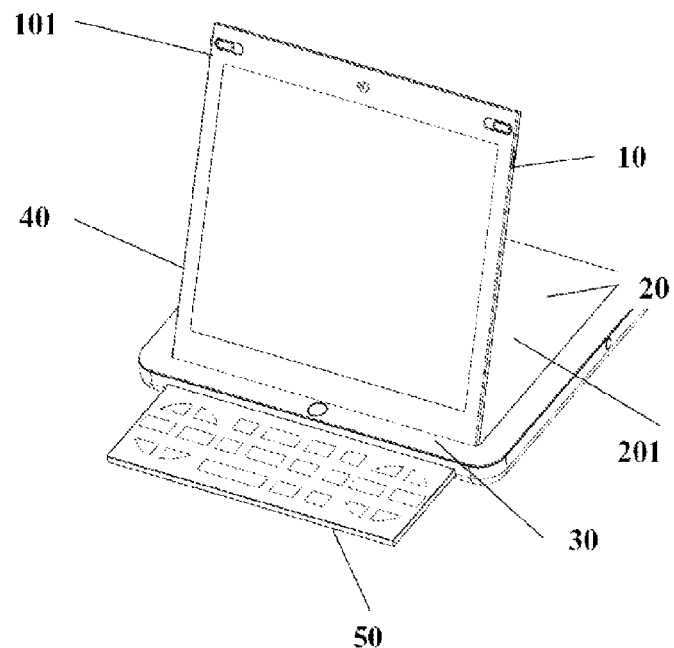
FIG. 1 is a structure diagram of an electronic device in an embodiment of the present disclosure.

Referring to FIG. 1, the electronic device comprises: a first body 10, comprising a first face 101 and a second face, wherein the first face 101 and the second face are two opposite faces on the first body 10; a second body 20, comprising a third face 201 and a fourth face, wherein the third face 201 and the fourth face are two opposite faces on the second body 20, the third face 201 being opposite to the second face; a first connecting unit 30 being connected with the first body 10 and the second body 20 respectively, wherein the first body 10 can be rotated relative to the second body 20 through the first connecting unit 30; the electronic device is in the first state, when an included angle between the first body 10 and the second body 20 is in a first interval ranging from a first value to a second value; the electronic device is in the second state, when the included angle between the first body 10 and the second body 20 is in a second interval ranging from the second value to a third value, wherein the first value is smaller than the second value, and the second value is smaller than the third value; and a first displaying unit 40 being set on the first face 101, wherein a display direction of the first displaying unit 40 is a first direction when the electronic device is in the second state, the first direction being a direction from a first edge of the first face 101 to a second edge opposite to the first edge; wherein the first connecting unit 30 is set at the first edge.

In particular, the first body 10 comprises opposite first face 101 and second face, wherein the first displaying unit 40 is set on the first face 101. That is, the first displaying unit 40 is set at the outermost side of the electronic device. The first displaying unit 40 may be a LED display screen, and also may be a touch screen and the like. The second body 20 comprises opposite third face 201 and fourth face, wherein the third face 201 and the second face are two opposite faces. The first body 10 is connected with the second body 20 through the first connecting unit 30, such that the first body 10 can be rotated relative to the second body 20, and the first connecting unit 30 can make an effect of fixing and supporting the first displaying unit 40 when there is an included angle between the first body 10 and the second body 20.

Then, when the included angle between the first body 10 and the second body 20 is in the first interval, that is, the included angle is a smaller angle, for example, [0°, 5°] or [0°, 10°], the electronic device is in the first state, i.e., the panel computer state; when the included angle between the first body 10 and the second body 20 is in the second interval, that is, the second interval and the first interval are mutually complementary angle intervals, for example, [5°, 90°] or [10°, 90°], the electronic device is in the second state, i.e., the notebook computer state. Of course, those skilled in the art can voluntarily set the specific values of the first interval, the second interval, the first value, the second value, and the third value, to which the present application does not particularly limit.

Figure 2:
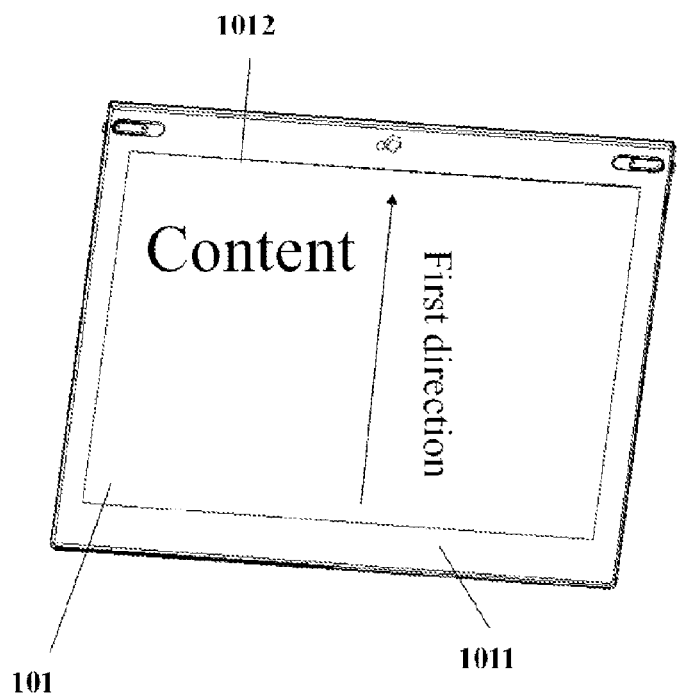
FIG. 2 is an illustrative diagram of a first direction of an embodiment of the present disclosure.

Further, the first connecting unit 30 is a connecting means set close to the body of the user. That is, as shown in FIG. 2, when the user uses the electronic device being in the second state, the first edge 1011 on the first face 101 is an edge closest to the user. Then, the first connecting unit 30 is set on the first edge 1011.

Further, when the electronic device is in the second state, that is, the included angle between the first body 10 and the second body 20 is in the second interval, the display direction of the first displaying unit 40 is the first direction. Please continuing to refer to FIG. 2, the first direction is the direction from the first edge 1011 of the first face 101 to the second edge 1012, i.e., the direction far away from the first connecting unit 30, i.e., the direction far away from the user, the display direction of the text "content" on the first displaying unit 40 as shown in FIG. 2.

Figure 3:
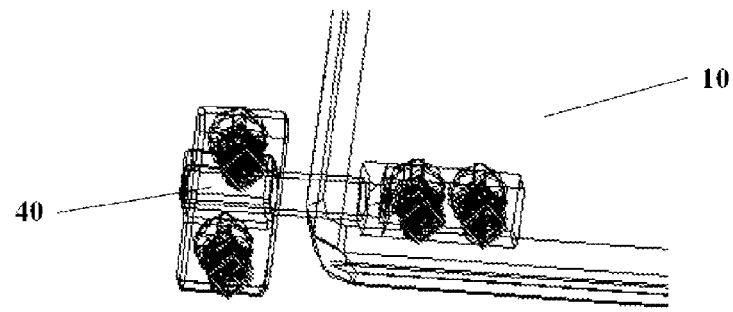
FIG. 3 is a structure diagram of a first connecting unit of an embodiment of the present disclosure.

In a specific implementation process, the first connecting unit 30 can be in particular a shaft. As shown in FIG. 3, the first sub connecting unit 301 set on the first body 10 comprises a first hole, a second hole, a third hole, a fourth hole, and a first connecting shaft, a first connecting rod connected with the first connecting shaft, a "Ω"-shaped fixing clip, wherein the first hole and the second hole are set on the first connecting rod, and the first connecting rod is fixed on the first body 10 with screws passing through the first hole and the second hole; the third hole and the fourth hole are set on the plane at the two edges of the "Ω"-shaped fixing clip respectively; and the first connecting shaft penetrates into the raised cavity in the middle of the "Ω"-shaped fixing clip, and is fixed in the "Ω"-shaped fixing clip with screws passing through the third hole and the fourth hole. Of course, the structure of the shaft may have a variety of designs, such as a folding shaft, a connecting rod shaft, a multi-axis shaft and the like, details omitted. All shafts that can realize a relative rotation between a functional body and an input body fall into a scope of the present disclosure, to which the present application does not particularly limit.

In the present embodiment, both the left and right sides of the first body 10 are set with a first connecting unit 301 for being connected with the second body 20.

Further, the electronic device further comprises: a first detecting unit for detecting whether the display direction is the first direction in the process of the electronic device being switched from the first state to the second state; and a display adjusting unit for changing the display direction into the first direction when the display direction is not the first direction.

In a particular implementation process, in the process of the electronic device being switched from the first state to the second state, for example, in the process that the user switches the electronic device from the panel persona computer state to the notebook computer state, the first detecting unit detects whether the display direction of the first displaying unit 40 at this time is the first direction. The display adjusting unit will adjust the display direction as the first direction when the display direction is not the first direction; the display adjusting unit does not take any action when the display direction is the first direction.

In particular, there are at least two display directions, such as the first direction, and the second direction being vertical to the first direction, when the electronic device is in the first state (for example, the panel computer state). Then, when the user switches the state of the electronic device, if the display direction of the first displaying unit 40 is the second direction, then the first detecting unit will detect that the display direc-tion at this time is the second direction, and send the display result to the display adjusting unit, so that the display adjusting unit controls the first displaying unit to adjust the display direction from the first direction to the second direction; if the display direction of the first displaying unit 40 is the first direction, then the first detecting unit will detect that the display direction at this time is the first direction display, and send the display result to the display adjusting unit, and the display adjusting unit will not take any action.

Further, the electronic device further comprises an input unit 50 for acquiring an input operation of the user; and a first fixing unit for connecting the input unit 50 with the second body 20.

In a particular implementation process, the input unit 50 can receive the input operation of the user. Then, the input unit 50 may be a keyboard, or may be a touch pad, or further may be a combination of the keyboard and the touch pad; the first fixing unit can connect the input unit 50 with the second body 20, for example, an engaging connection or a slide connection and the like. In the present embodiment, the input unit 50 is in particular a keyboard.

In particular, when the first fixing unit connects the input unit 50 with the second body 20 by means of engaging, the first fixing unit may in particular comprise a groove set on the fourth face of the second body 20, at least one first engager set inside the groove and at least one second engager matching with the at least one first engager set on the input unit 30. The groove can hold the input unit 50, and the input unit 50 can be connected with the body 20 through a match of the at least one first engager with at least one second engager.

In an embodiment, when the first fixing unit connects the input unit 50 with the second body 20 by means of sliding, the first fixing unit can in particular be a cavity set on the fourth face of the second body 20 which is capable of holding the input unit 50, with a slider set on the inner wall of the cavity, and the input unit 50 can connect with the second body through the slider. Of course, the specific structure of the first fixing unit has other forms which can be voluntarily set by those skilled in the art. The present application does not limit thereto.

Further, the electronic device further comprises: a second connecting unit 60 being connected with the second body 20, wherein the input unit 50 can be moved relative to the second body 20 through being connected with the second connecting unit 60, such that the input unit 50 is switched between the operation state and the non-operation state.

In a particular implementation process, the input unit 50 can be made a relative movement relative to the second body 20 through the second connecting unit 60, and such movement may be a rotation or may be a slide. The input unit 50 is in the operation state when the input unit 50 is rotated out, or drawn out by the user; otherwise, the input unit 50 is in the non-operation state when the input unit 50 is rotated back, or pushed back by the user.

In particular, a sensing unit can be set inside the groove or the cavity. When the input unit 50 is rotated out from the groove or drawn out from the cavity through the second connecting unit 60, the sensing unit senses the above actions, such that the input unit 50 is in an enabled state. That is, the input unit is in the operation state; when the input unit 50 is rotated into the groove or pushed back into the cavity through the second connecting unit 60, the sensing unit senses the above actions, such that the input unit 50 is in a disabled state, that is, the input unit is in the non-operation state.

Figure 4:
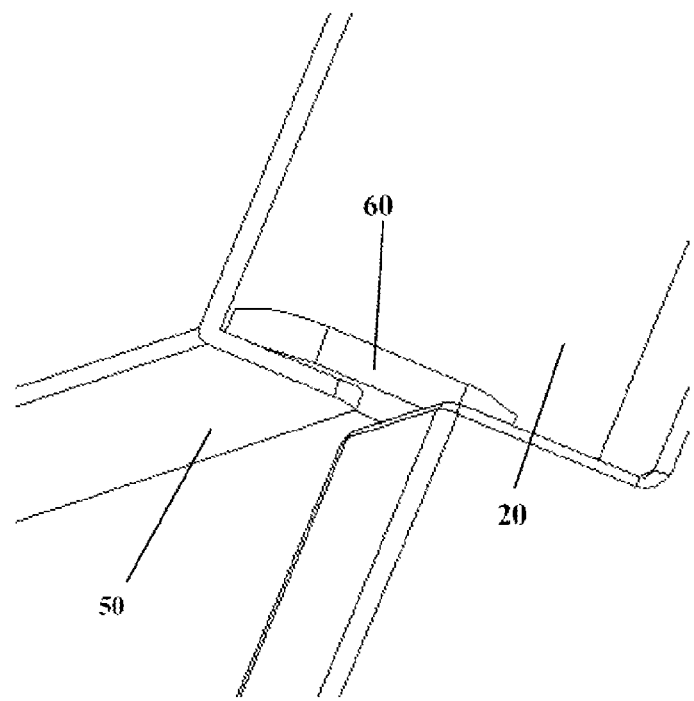
FIG. 4 is a structure diagram of a second connection unit of an embodiment of the present disclosure.

In an embodiment, the specific structure of the second connecting unit 60 may be a shaft, or may be a slider inside the first fixing unit as described above. As shown in FIG. 4, when the second connecting unit 60 is a shaft, the second sub connecting unit set on the second body 20 comprises a fifth hole, a sixth hole, a seventh hole, a second connecting shaft, and a second connecting rod, wherein the fifth hole is set on the second body 20, and the sixth hole and the seventh hole are set at the two terminals of the second connecting shaft respectively; the third sub connecting unit set on the input unit 50 comprises an eighth hole and a third connecting rod, wherein the eighth hole is set on the input unit 50; the second body 20 is connected with the second connecting rod by the second connecting shaft passing through the fifth hole and the sixth hole, and the input unit 50 is connected with the second connecting rod by the third connecting shaft passing through the seventh hole and the eighth hole, such that the second body 20 is connected with the input unit 50, thus rotating the input body 50 to make it rotate relative to the functional body. The structure of the shaft may have a variety of designs, such as a folding shaft, a connecting rod shaft, a multi-axis shaft and the like, details omitted. All shafts that can realize a relative rotation between the functional body and the input body fall into a scope of the present utility mode. In the present embodiment, both the left and right sides of the second body 20 are set with a second sub connecting unit.

In another embodiment, the specific structure of the second connecting unit 60 may further be a slider. At this time, two pieces of sliders are set at the back of the second body 20, wherein the separation distance between the two pieces of sliders may be slightly smaller than the width of the input unit 50, such that the input unit 50 slides on the sliders by being drawn out by the user, so as to achieve a relative slide between the second body 20 and the input unit 50. Since the number of the second connecting unit 60 may be one or may also be more than one, those skilled in the art can set it according to actual needs, details omitted.

Further, the electronic device further comprises a wireless transmitting unit for carrying out data transmission between the input unit 50 and the second body 20 after the input unit 50 is disconnected from the second body 20.

In a particular implementation process, the input unit 50 may further be disconnected from the second body 20. Then, at this time, after the input unit 50 is disconnected from the second body 20, the data communication between the input unit 50 and the second body 20 is carried out through a cooperation of a first wireless sub transmitting unit set on the second body 20 and a second wireless sub transmitting unit set on the input unit 50, such that the user is able to operate and control the electronic device at a relatively remote distance without being subjected to the length of data lines.

Further, the input unit 50 is in the first operating mode when the input unit 50 is connected with the second body 20; the input unit 50 is in the second operating mode when the input unit 50 is disconnected with the second body 20.

In a particular implementation process, the first operating mode may be a basis keyboard mode, and the second operating mode may be a game pad mode. Then, the input unit 50 is in the first operating mode, i.e., the basic keyboard mode, when the input unit 50 is connected with the second body 20; the input unit 50 is in the second operating mode, i.e., the game pad mode, when the input unit 50 is disconnected from the second body 20.

In particular, the keyboard layout on the input unit 50 can be set in accordance with the layout of buttons of the game pad. Then, when the user disconnects the input unit 50 from the second body 20, the input unit 50 can be used as a game pad so as to control the electronic device. As such, the user can operate more convenient while playing games and the use of double functions of the input unit 50 also makes the scope of applications of the electronic device broader.

Further, the input unit 50 comprises an acceleration sensing unit for sensing an acceleration received by the input unit 50 when the input unit 50 is operating in the second operating mode.

In a particular implementation process, when the input unit 50 is in the second operating mode, the input unit 50 may further comprise an acceleration sensing unit. As such, when the user plays games, the acceleration sensing unit can sense the acceleration received by the input unit 50, so as to control operations in the games. For example, when the user plays a racing game, the input unit 50 can be used as a steering wheel to control the direction. Then, when it needs to make a turn to the left, the user needs to incline the input unit 50 to the left, at this time, the acceleration sensing unit 50 can sense that the input unit 50 is inclining to the left and will know that the user controls the racing car to turn to the left.

Further, the electronic device may further comprise a second image acquisition unit being set at a position of the first face close to the second edge.

In another embodiment, the electronic device further comprises: a second displaying unit being set on the second face.

In a particular implementation process, when the first body 10 is vertical to the second body 20, the user can separately use the second displaying unit, and also can simultaneously use the first displaying unit 40 and the second displaying unit.

In particular, when the user only uses the second displaying unit, the first displaying unit 40 may operate or may not operate; when both the first displaying unit 40 and the second displaying unit operate, two users can simultaneously use the electronic device at the two sides of the body 10.

Further, the electronic device further comprises a second detecting unit for detecting whether there is a predetermined triggering operation; and a switching unit for controlling the second displaying unit to be in the non-operation state when it is detected that there is the predetermined triggering operation.

In a particular implementation process, the second detecting unit detects whether there is the predetermined triggering operation. The predetermined triggering operation is used to trigger a state switching of the second displaying unit; a control instruction is generated to control the second displaying unit to be switched to the non-operation state when the second detecting unit detects the predetermined triggering operation.

In particular, when the user needs to switch the electronic device from the panel computer state to the notebook computer state, there will be a predetermined triggering operation, for example, pushing down an entity button or making a gesture operation; after the second detecting unit detects the predetermined triggering operation, the control instruction is generated and sent to the switching unit, and then the switching unit executes the control instruction to control the second displaying unit to be switched to the non-operation state, thus realizing a flexible switch between the first displaying unit and the second displaying unit.

Further, the electronic device further comprises a first image acquisition unit being set at a position of the first face close to the first edge.

In a particular implementation process, the second image acquisition unit can be set at the position of the first face 101 close to the second edge 1012. As such, the user rotates the first body 10 after using the second displaying unit, such that the electronic device is switched to the panel computer state.

Then, the user is able to normally carry out video communication or take a photograph without changing the direction of the electronic device.

Below will be a detailed specification of the operation process of the electronic device.

When the user switches the electronic device from the panel computer state to the notebook computer state, the user rotates the shaft to rotate the first body 10, such that the first body 10 can be horizontally placed on a desk or a plane. The angle of the first body can be flexibly adjusted through the first connecting unit 30, so as to satisfy the user's requirements for different angles of the display screen. Then, the input unit 50 is drawn out from the first fixing unit, so that operations of inputting and the like can be performed. In this way, the electronic device realizes a quick switch to the notebook computer state; when the user ends using the electronic device, that is, the user needs to switch the electronic device from the notebook computer state to the panel computer state, the user can rotate the input unit 50 into the groove at the back of the second body 20, such that the input unit 50 is fully embedded into the second body 20. In this way, the panel computer realizes a quick switch from the notebook computer using mode to the panel computer using mode.

One or more technical solutions provided in the embodiments of the present application have at least the following technical effects or advantages:

1. A first connecting unit is set on the first edge of the first face of the first body, such that the first body is connected with the second body through the first connecting unit, and can be rotated relative to the second body. Further, the first edge is a starting point of the display direction of the first displaying unit. Then, it can be known therefrom that the first connecting unit is set at a position close to the body of the user, such that the user is able to conveniently rotate the first body while using the electronic device, which thus effectively solves the technical problem that the panel electronic device fails to be quickly switched between the panel computer state and the notebook computer state, so as to meet the user's double needs for entertainment experience and highly-efficient commercial work.

2. The first connecting unit is set between the first body and the second body, such that the first body can be moved relative to the second body, which thus effectively solves the technical problem that the angle of the panel electronic device cannot be flexibly adjusted in the process of using the panel electronic device, so as to achieve a flexible adjustment of the angle of the display screen of the panel electronic device.

3. A detachable input unit is set on the second body, such that the user is able to use an entity input device to carry out text input in the process of using the panel electronic device, and the input device can carry out data communication with the panel electronic device through the wireless transmission unit, which thus effectively solves the technical problem that a remote communication cannot be carried out between an entity keyboard and the panel electronic device, so that the user can perform input operation on the panel electronic device by using the input unit at a remote distance.

4. The panel electronic device further comprises the second displaying unit, such that in the process of using the panel electronic device, the panel electronic device can be provided for two users to use simultaneously and further can be quickly switched between the panel computer state and the notebook computer state.

Although the preferred embodiments of the present disclosure have been described, those skilled in the art can make further modifications and amendments to these embodiments once they know basic inventive concepts. Therefore, the appended claims intent to be explained as including the present preferred embodiments as well as all modifications and amendments that fall into the scope of the present disclosure.

Obviously, those skilled in the art can make various alternations and modifications to the present disclosure without departing from the spirit and scope of the present disclosure. If these alternations and modifications made to the present disclosure belong to the scope of the claims of the present disclosure and its equivalent technologies, the present disclosure intends to include these alternations and modifications.

The invention claimed is:

1. An electronic device comprising a first state and a second state, comprising:
   a first body, comprising a first face and a second face, wherein the first face and the second face are two opposite faces on the first body;
   a second body, comprising a third face and a fourth face, wherein the third face and the fourth face are two opposite faces on the second body, and the third face is opposite to the second face;
   a first connecting unit being connected with the first body and the second body, respectively, wherein the first body can be rotated relative to the second body through the first connecting unit;
   the electronic device is in the first state, when an included angle between the first body and the second body is in a first interval ranging from a first value to a second value;
   the electronic device is in the second state, when the included angle between the first body and the second body is in a second interval ranging from the second value to a third value, wherein the first value is smaller than the second value, and the second value is smaller than the third value; and
   a first displaying unit being set on the first face, wherein a display direction of the first displaying unit is a first direction when the electronic device is in the second state, the first direction being a direction from a first edge of the first face to a second edge opposite to the first edge;
   wherein the first connecting unit is set at the first edge.

2. The electronic device as claimed in claim 1, further comprising:
   a first detecting unit for detecting whether the display direction is the first direction in a process of the electronic device being switched from the first state to the second state; and
   a display adjusting unit for changing the display direction to the first direction when the display direction is not the first direction.

3. The electronic device as claimed in claim 1, further comprising:
   an input unit for acquiring an input operation of a user; and
   a first fixing unit for connecting the input unit with the second body.

4. The electronic device as claimed in claim 3, further comprising a second connecting unit being connected with the second body, wherein the input unit can be moved relative to the second body through being connected with the second connecting unit, such that the input unit is switched between an operation state and a non-operation state.

5. The electronic device as claimed in claim 3, further comprising a wireless transmitting unit for data transmitting between the input unit and the second body after the input unit being disconnected from the second body.

6. The electronic device as claimed in claim 5, wherein the input unit is in a first operating mode when the input unit is connected with the second body; and the input unit is in a second operating mode when the input unit is disconnected from the second body.

7. The electronic device as claimed in claim 6, further comprising an acceleration sensing unit for sensing an acceleration received by the input unit when the input unit is in the second operating mode.

8. The electronic device as claimed in claim 1, the first body further comprises a second displaying unit being set on the second face.

9. The electronic device as claimed in claim 8, further comprising
   a second detecting unit for detecting whether there is a predetermined triggering operation; and
   a switching unit for controlling the second displaying unit to be in the non-operation state when the predetermined triggering operation is detected.

10. The electronic device as claimed in claim 8, further comprising a first image acquisition unit being set at a position of the first face close to the first edge.

11. The electronic device as claimed in claim 1, further comprising a second image acquisition unit being set at a position of the first face close to the second edge.

\* \* \* \* \*